United States Patent
Tanabe et al.

(10) Patent No.: US 8,210,941 B2
(45) Date of Patent: Jul. 3, 2012

(54) MEDIUM POSITION DETECTION DEVICE, DISPLAY DEVICE, GAME DEVICE AND TOKEN GAME DEVICE

(75) Inventors: Yasufumi Tanabe, Yokohama (JP); Kenichi Takizawa, Kawasaki (JP); Toshio Matsumura, Yokohama (JP); Satoshi Watanabe, Kawasaki (JP)

(73) Assignee: NAMCO BANDAI Games Inc., Tokyo (JP)

( * ) Notice: Subject to any disclaimer, the term of this patent is extended or adjusted under 35 U.S.C. 154(b) by 1520 days.

(21) Appl. No.: 11/632,704

(22) PCT Filed: Jul. 22, 2005

(86) PCT No.: PCT/JP2005/013472
§ 371 (c)(1),
(2), (4) Date: Feb. 6, 2007

(87) PCT Pub. No.: WO2006/009248
PCT Pub. Date: Jan. 26, 2006

(65) Prior Publication Data
US 2008/0076550 A1  Mar. 27, 2008

(30) Foreign Application Priority Data

Jul. 22, 2004 (JP) ................................. 2004-214257

(51) Int. Cl.
*A63F 9/24* (2006.01)
*A63F 13/00* (2006.01)
(52) U.S. Cl. ........................................................ 463/30

(58) Field of Classification Search ..................... 463/16, 463/22, 30–34; 271/121 B
See application file for complete search history.

(56) References Cited

U.S. PATENT DOCUMENTS

| 6,047,963 A * | 4/2000 | Pierce et al. ............... 273/121 B |
| 2001/0015524 A1 * | 8/2001 | Shinbo et al. ............. 273/126 A |
| 2002/0134924 A1 | 9/2002 | Ohshimo |

FOREIGN PATENT DOCUMENTS

| JP | A 2001-224835 | 8/2001 |
| JP | 2002286859 A * | 10/2002 |
| JP | A 2002-286859 | 10/2002 |
| JP | 2004141262 A * | 5/2004 |
| JP | A 2004-141262 | 5/2004 |

* cited by examiner

*Primary Examiner* — Peter DungBa Vo
*Assistant Examiner* — Jasson Yoo
(74) *Attorney, Agent, or Firm* — Oliff & Berridge, PLC

(57) ABSTRACT

A medium position detection device including: a medium moving space (10) formed in which a plurality of media (30) can simultaneously move without overlapping in a predetermined direction; a light-guiding plate (11) which perpendicularly intersects the predetermined direction and defines the front of the medium moving space (10); a light source (20) disposed to emit light entering an end surface of the light-guiding plate (11); a reflecting section (13) formed in the light-guiding plate (11) so that the light having entered the light-guiding plate (11) is reflected by the reflecting section (13) and exits the light-guiding plate (11) through a back surface of the light-guiding plate (11); and detection means which detects the light from the light-guiding plate (11).

13 Claims, 17 Drawing Sheets

# MEDIUM POSITION DETECTION DEVICE, DISPLAY DEVICE, GAME DEVICE AND TOKEN GAME DEVICE

TECHNICAL FIELD

The present invention relates to a medium position detection device, a display device, a game device, and a token game device capable of detecting the position of a medium while allowing observation of a passage of the medium.

BACKGROUND ART

In a general game device, when providing a detection target region group in which detection target regions are adjacently disposed in parallel and detecting the detection target region through which a game medium has passed, a pair of optical sensors is disposed corresponding to each detection target region, and the game medium is allowed to pass between the pair of optical sensors to detect the game medium.

The applicant of the invention has proposed disposing light-emitting/receiving elements of an optical sensor in the detection target region so that the optical axis passes diagonally from one side to the other side of the passage direction of the game medium to reliably detect the rotating disk-shaped game medium (see Patent Document 1).
Patent Document 1: JP-A-2001-224835

DISCLOSURE OF THE INVENTION

In the above game medium detection method, since the game medium is allowed to pass between the pair of optical sensors disposed corresponding to each detection target region, the game medium passing through the detection target region cannot be observed due to the presence of one of the optical sensors.

Therefore, although the above method can be applied to a game in which the game medium which passes through the detection target region is detected while observing the moving game medium, the moving game medium cannot be observed due to the presence of one of the optical sensors when detecting the game medium over the entire region in which the game medium moves.

Moreover, since a pair of optical sensors is disposed corresponding to each detection target region, the production takes time, and cost is increased.

An objective of the invention is to provide a medium position detection device, a display device, a game device, and a token game device which allow the passage state of the medium to be observed over the entire medium passage region, allow the medium to be detected over the entire medium passage region, and are easily manufactured at low cost.

To achieve the objective, a medium position detection device of the invention comprises:
a medium moving space in which a plurality of media can simultaneously move without overlapping one another in a predetermined direction;
a light source which emits light in a direction intersecting the predetermined direction;
a reflecting section which reflects light from the light source toward the medium moving space; and
detection means which detects light reflected by the reflecting section.

According to the invention, since light from the light source is reflected by the reflecting section toward the medium moving space, and the reflected light is detected by the detection means, the position of the medium can be detected when the reflected light is blocked by the medium while observing the medium which passes through the medium moving space. The passage state of the medium can be observed and detected over almost the entire medium moving space by forming the reflecting sections over almost the entire medium moving space.

It suffices to provide one detection means at a position opposite to each reflecting section. Therefore, the installation time and cost can be reduced in comparison with the case of providing a pair of detection means for each detection point.

In this invention, a light-guiding plate may be provided so that light from the light source enters an end surface of the light-guiding plate; and the reflecting section may be formed in the light-guiding plate so that the light having entered the light-guiding plate is reflected by the reflecting section and exits the light-guiding plate through a surface of the light-guiding plate on the side of the detection means.

According to this configuration, light from the light source can be efficiently guided toward the detection means by allowing the light from the light source to enter the end surface of the light-guiding plate and exit the light-guiding plate toward the detection means by the reflecting section formed in the light-guiding plate.

Another medium position detection device according to the invention comprises:
a medium moving space formed so that a plurality of media can simultaneously move therein without overlapping in a predetermined direction;
a light-guiding plate which perpendicularly intersects the predetermined direction and defines the front of the medium moving space;
a light source disposed to emit light entering an end surface of the light-guiding plate;
a reflecting section formed in the light-guiding plate so that the light having entered the light-guiding plate is reflected by the reflecting section and exits the light-guiding plate through a back surface of the light-guiding plate; and
detection means which detects the light from the light-guiding plate.

According to the invention, since light from the light source enters the end surface of the light-guiding plate which defines the front of the medium moving space and the light then exits toward the detection means through the back surface of the light-guiding plate by the reflecting section formed in the light-guiding plate, the position of the medium can be detected when the reflected light is blocked by the medium while observing the medium which passes inside the medium moving space through the light-guiding plate. The passage state of the medium can be observed and detected over almost the entire light-guiding plate by forming the reflecting sections over almost the entire light-guiding plate.

It suffices to provide one detection means at a position opposite to each reflecting section. Therefore, the installation time and cost can be reduced.

In this medium position detection device,
the detection means may be provided on a base plate disposed on the back side of the medium moving space; and
a plurality of light-guiding holes through which light from the light-guiding plate passes may be formed in the base plate in a staggered arrangement or a matrix, and the detection means may detect the light having passed through the light-guiding holes.

According to this configuration, since only light reflected by the reflecting section is applied to the detection means through the light-guiding holes by allowing light from the light-guiding plate to pass through the light-guiding holes provided in the base plate toward the detection means, a situation can be prevented in which external light enters the detection means when the medium passes through the position of the detection means to hinder detection, whereby reliable detection can be achieved.

Moreover, a detailed position of the medium can be detected by providing the light-guiding holes in a staggered arrangement or a matrix.

The reflecting section may be formed in the light-guiding plate as a conical depression which is open on the side opposite to the detection means.

According to this configuration, the inclined surface of the conical depression serves as a reflecting surface so that light can be reliably reflected and guided from the light-guiding plate to the detection means. Moreover, light can be guided to the detection means in a focused state without being diffused due to the inclined surface.

In addition, since the conical depression does not hinder observation of the medium, an excellent observation state can be ensured.

The detection means may include a plurality of light-receiving sensors; and the light-receiving sensors may be disposed in a staggered arrangement.

According to this configuration, the medium can be reliably detected irrespective of the position of the medium which passes through the medium moving space by disposing the light-receiving sensors in a staggered arrangement. In particular, the shape of the medium and the like can be detected by reducing the interval between the light-receiving sensors.

In this case, the reflecting section may be disposed at a position opposite to the light-receiving sensor.

According to this configuration, reflected light from the reflecting section can be reliably applied to the light-receiving sensors.

According to the invention, there is provided a display device having the above-described medium position detection device, the display device comprising:

a liquid crystal panel disposed on the front of the light-guiding plate;

a base plate disposed on the back side of the medium moving space; and a reflecting material provided on the front of the base plate and reflects light from the light-guiding plate, wherein a plurality of light-guiding holes through which light from the light-guiding plate passes are provided in the base plate in a staggered arrangement or a matrix; and wherein the light having passed through the light-guiding holes is detected by the detection means disposed on the back side of the base plate.

According to the invention, since the liquid crystal panel is disposed on the front of the light-guiding plate, the base plate is disposed on the back side of the medium moving space, and the reflecting material is provided on the front of the base plate, the medium which passes through the medium moving space is not obstructed by the reflecting material, and the image and the like displayed on the liquid crystal panel can be seen while ensuring a visible state. Moreover, the liquid crystal panel can be provided with sufficient brightness due to the reflecting material, and the position of the medium can be reliably detected by the detection means.

In this invention, at least one of a light collecting sheet and a light diffusion sheet may be provided between the light-guiding plate and the liquid crystal panel.

According to this configuration, the liquid crystal panel can be maintained with a uniform brightness by the light collecting sheet and the light diffusion sheet, whereby an excellent display state can be obtained.

In this invention, a backlight for the liquid crystal panel may be provided between the base plate and the medium moving space;

the backlight may include a light-guiding plate for the liquid crystal panel and a light source which emits light entering an end surface for the light-guiding plate for the liquid crystal panel;

the light guiding plate for the liquid crystal panel may include a plurality of reflecting sections causing light to exit toward the liquid crystal panel, and communication holes communicating with the light-guiding holes in the base plate; and a cylindrical member which blocks light may be provided to each of the communication holes.

According to this configuration, since the backlight for the liquid crystal panel including the light-guiding plate for the liquid crystal panel and the light source are provided between the base plate and the medium moving space, and the reflecting section which reflects light toward the liquid crystal panel is provided in the light-guiding plate for the liquid crystal panel, light from the backlight can be efficiently applied to the liquid crystal panel without affecting the medium moving space.

Moreover, since the cylindrical member is provided to the communication hole in the light-guiding plate for the liquid crystal panel, a situation can be reliably prevented in which light from the light source of the liquid crystal backlight affects the detection means.

In this invention, a reflecting material which reflects light from the light-guiding plate for the liquid crystal panel may be provided between the base plate and the light-guiding plate for the liquid crystal panel; and communication holes communicating with the light-guiding holes in the base plate may be provided in the reflecting material.

According to this configuration, light from the light-guiding plate for the liquid crystal panel can be reflected by the reflecting material and efficiently applied to the liquid crystal panel without affecting the medium moving space. Moreover, light from the reflecting section can be reliably guided to the detection means through the communication hole.

When the display device has the light-guiding plate for the liquid crystal penal, at least one of a light collecting sheet and a light diffusion sheet may be provided on the front of the light-guiding plate for the liquid crystal panel; and communication holes communicating with the light-guiding holes in the base plate may be provided in the light collecting sheet and the light diffusion sheet.

According to this configuration, light from the light-guiding plate for the liquid crystal panel can be uniformly applied to the liquid crystal panel using the light collecting sheet and the light diffusion sheet. Moreover, since the communication hole which communicates with the light-guiding hole in the base plate is provided in the light collecting sheet and the light diffusion sheet, the detection means can reliably detect light.

A game device of the invention comprises the above-described display device.

According to this configuration, a game can be performed by superimposing the game image on the medium moving space while detecting the position of the medium which passes through the medium moving space with observation.

According to the invention, there is provided another game device having the above-described medium position detection device and preceding with a game based on a detected medium position, the game device comprising:

display means which displays a game progress image; and
  a half mirror which synthesizes an image of the display means and an image of a medium which moves inside the medium moving space.

According to the invention, a game can be performed by superimposing the game image on the medium moving space by displaying the game image on the half mirror while observing the medium which passes through the medium moving space of the medium position detection device through the half mirror. The game image can be variously changed according to the medium detection result from the medium position detection device, whereby an interesting game can be provided.

According to the invention, there is provided a further game device which includes the above-described medium position detection device having the light-guiding plate and precedes with a game based on a detected medium position, the game device comprising a liquid crystal panel which displays a game progress image on the front of the light-guiding plate.

According to this invention, a game can be performed by superimposing the game image on the medium moving space by displaying the game image on the liquid crystal panel while observing the medium which passes through the medium moving space of the medium position detection device through the liquid crystal panel. The game image can be variously changed according to the medium detection result from the medium position detection device, whereby an interesting game can be provided.

According to the invention, there is provided a token game device having the above-described medium position detection device provided with the light-receiving sensor, the token game device comprising:

pins provided between the light-receiving sensors; and
  game processing means which performs game progress control based on a detection position of a token which moves inside the medium moving space.

According to this invention, the token which passes between the pins can be detected by the light-receiving sensor, and the game progress control can be performed by the game processing means based on the detected token position, whereby a token game with a wide range of variety can be achieved.

BEST MODE FOR CARRYING OUT THE INVENTION

Embodiments of the invention are described below in detail with reference to the drawings.

Figure 1:
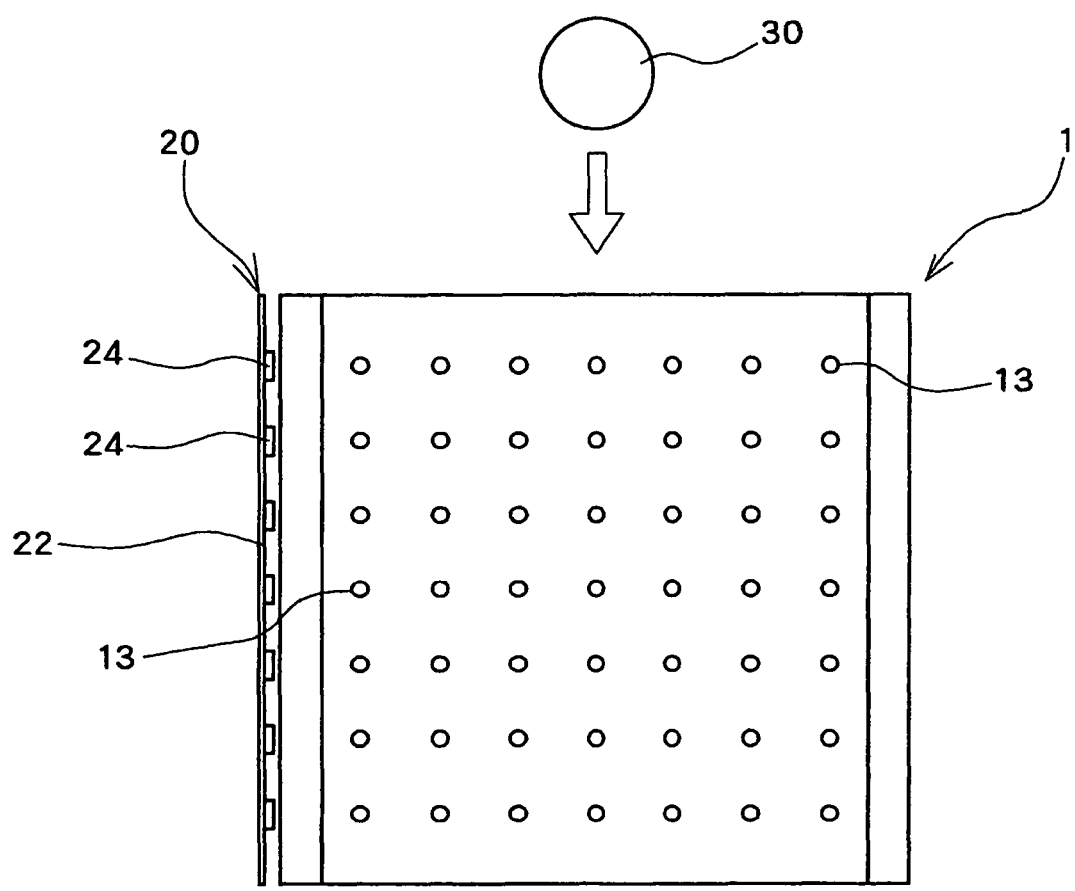
FIG. 1 is a front view showing a medium position detection device according to one embodiment of the invention.
Figure 2:
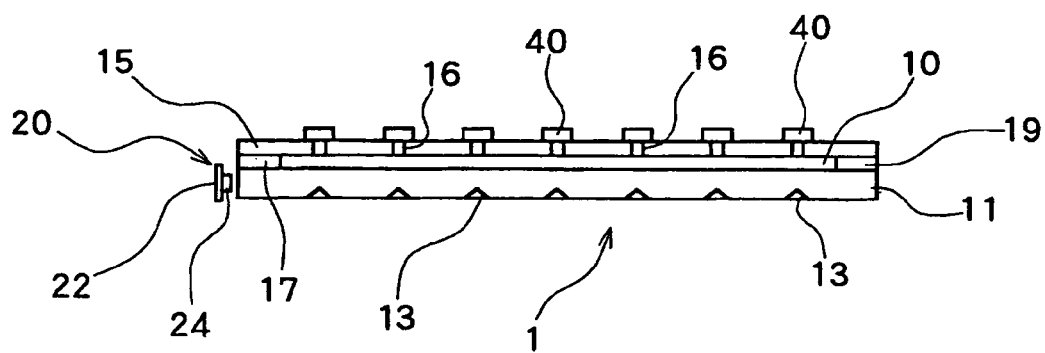
FIG. 2 is a cross-sectional view showing the medium position detection device of FIG. 1.
Figure 3:
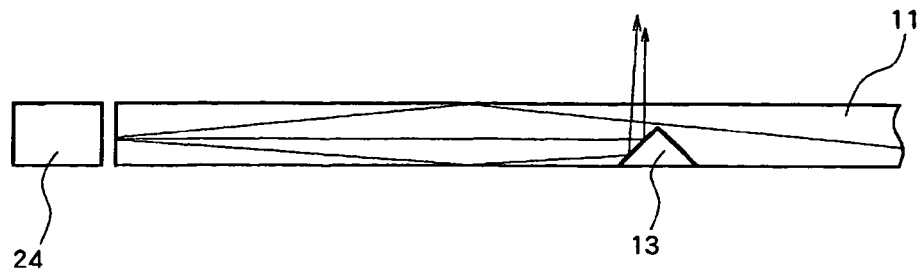
FIG. 3 is a partial sectional view showing a light-guiding plate according to one embodiment of the invention.

FIGS. 1 to 3 are views showing a medium position detection device according to one embodiment of the invention.

A medium position detection device 1 according to this embodiment includes a rectangular parallelepiped medium moving space 10 (see FIG. 2) in which a plurality of thin disk-shaped media 30 (see FIG. 1) such as tokens or coins can simultaneously move, a light source 20 which emits light in the width direction of the medium moving space 10, a reflecting section 13 which reflects light from the light source 20 so that light from the light source 20 passes through the medium moving space 10, and a light-receiving sensor 40 (see FIG. 2) as detection means which detects light which has passed through the medium moving space 10.

As shown in FIG. 2, the medium moving space 10 is formed by a flat light-guiding plate 11 which perpendicularly intersects the depth direction of the medium moving space 10, a back plate (or base plate) 15, and a pair of side plates 17 and 19 which are parallel in the depth direction.

A distance between front and back of the medium moving space 10 (or a distance between a back surface of the light-guiding plate 11 and a front surface of the back plate 15), that is, a gap between the light-guiding plate 11 and the back plate 15 is less than twice the thickness of the medium 30 so that the moving media 30 do not overlap in the depth direction.

The top and bottom of the medium moving space 10 are open so that the medium 30 can pass through the medium moving space 10.

The light source 20 includes a plurality of light-emitting elements 24 linearly mounted on a base plate 22 at specific intervals. As the light-emitting element 24, an infrared emitting diode which emits invisible light is used.

The base plate 22 is secured using fixing means (not shown) so that the optical axis of each light-emitting element 24 perpendicularly intersects the side surface of the light-guiding plate 11.

Therefore, the optical axis of the light-emitting element 24 perpendicularly intersects the depth direction of the medium moving space 10 so that light from the light-emitting element 24 emits along the front of the medium moving space 10.

In this embodiment, the light source 20 is disposed on one side of the light-guiding plate 11. Note that the light source 20 may be disposed on each side of the light-guiding plate 11.

When disposing the light source 20 on only one side of the light-guiding plate 11, the light utilization efficiency can be increased by providing a reflecting sheet on the side opposite to the light source 20.

The light-guiding plate 11 is formed of a transparent resin such as an acrylic resin or a polycarbonate resin so that the medium 30 which moves inside the medium moving space 10 can be observed.

The reflecting sections 13 are disposed in the light-guiding plate 11 in a matrix, as shown in FIG. 1, so that light having entered the light-guiding plate 11 exits (or transmits) through the back surface of the light-guiding plate 11.

The reflecting sections 13 may be disposed in a staggered arrangement depending on the type, number, and position of the light source 20, or the interval between the reflecting sections 13 may be reduced depending on the distance from the light source 20.

As shown in FIGS. 2 and 3, the reflecting section 13 is a conical depression formed in the front surface of the light-guiding plate 11. The center axis of the conical depression perpendicularly intersects the light-guiding plate 11. The reflecting section 13 is formed to have an open angle of about 90 degrees. The reflecting section 13 is formed so that most of the light having entered the light-guiding plate 11 enters the back surface at an incident angle equal to or more than the critical angle.

The open angle may be appropriately set depending on the refractive index of the light-guiding plate 11.

For example, since the refractive index of an acrylic resin is 1.49, the critical angle is 42.16 degrees. If light enters at an incident angle equal to or more than 42.16 degrees, total reflection occurs.

The shape of the reflecting section 13 is not limited to conical. The shape of the reflecting section 13 may be appropriately set depending on the material and the type, number, and position of the light source.

For example, the shape of the reflecting section 13 may be a polygonal pyramid such as a triangular pyramid or a quadrangular pyramid, or may be a shape with a curved surface such as a semicircular sphere or an elliptical sphere.

The back plate 15 is opaque and square. As shown in FIG. 2, a light-guiding hole 16 is provided in the back plate 15, and light from the light-guiding plate 11 can pass through the light-guiding hole 16 toward the back surface. The light-receiving sensor 40 which detects light having passed through the light-guiding hole 16 is secured to the back surface of the back plate 15.

The interval, arrangement, and diameter of the light-guiding holes 16 are determined depending on the shape and size of the medium 30, the medium position detection accuracy, and the like.

In the embodiment shown in FIG. 1, the interval between the light-guiding holes 16 is set at a value 1.25 times the radius of the medium 30.

This allows the detection area of the medium 30 to be subdivided into sections in a number equal to or greater than the number of the light-receiving sensors 40 in combination with the position of the light-receiving sensor 40 which does not detect light.

An embodiment of the invention relating to a token game device is described below with reference to FIGS. 4 to 18.

Figure 4:
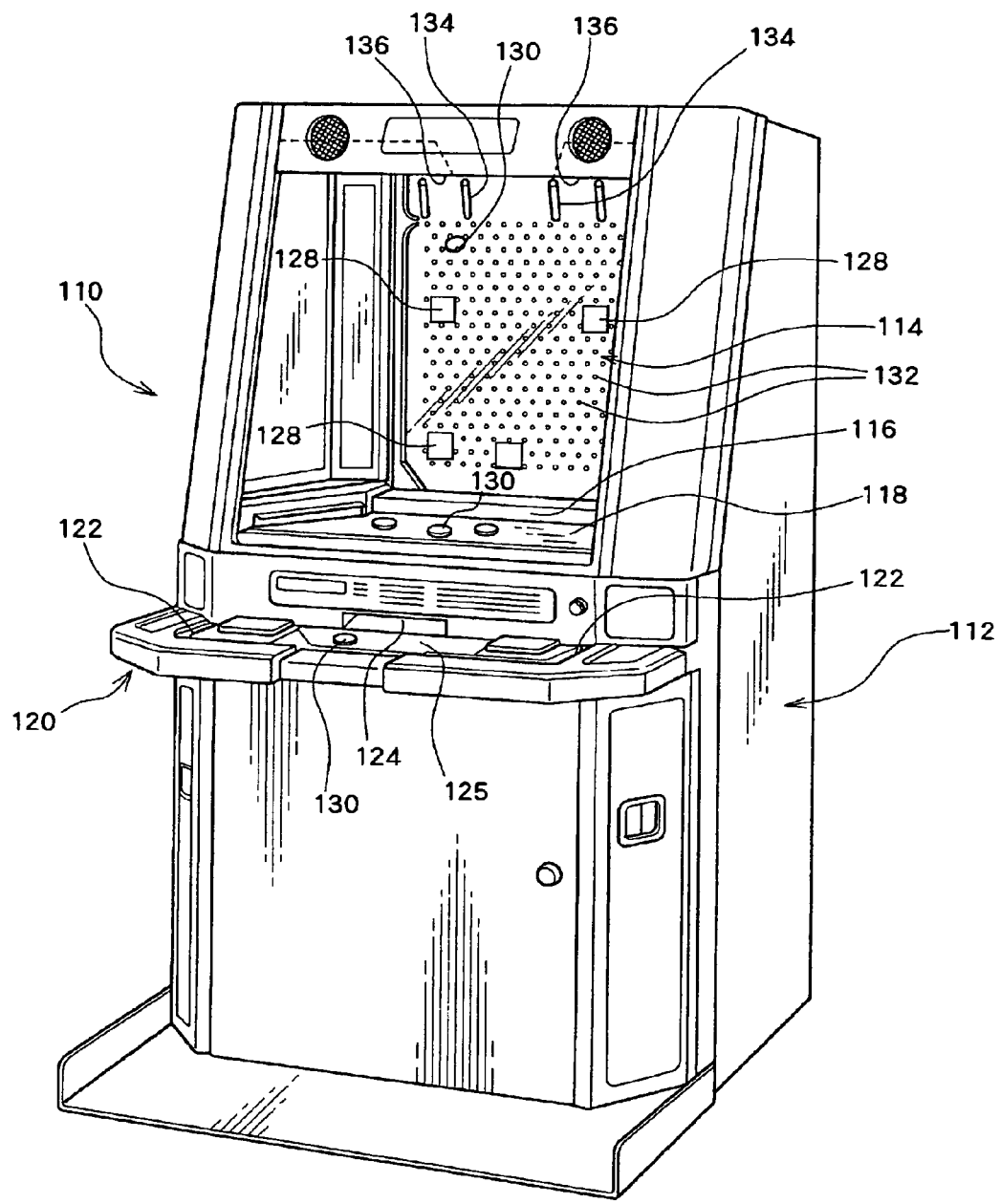
FIG. 4 is a perspective view from a front side showing a token game device according to one embodiment of the invention.
Figure 5:
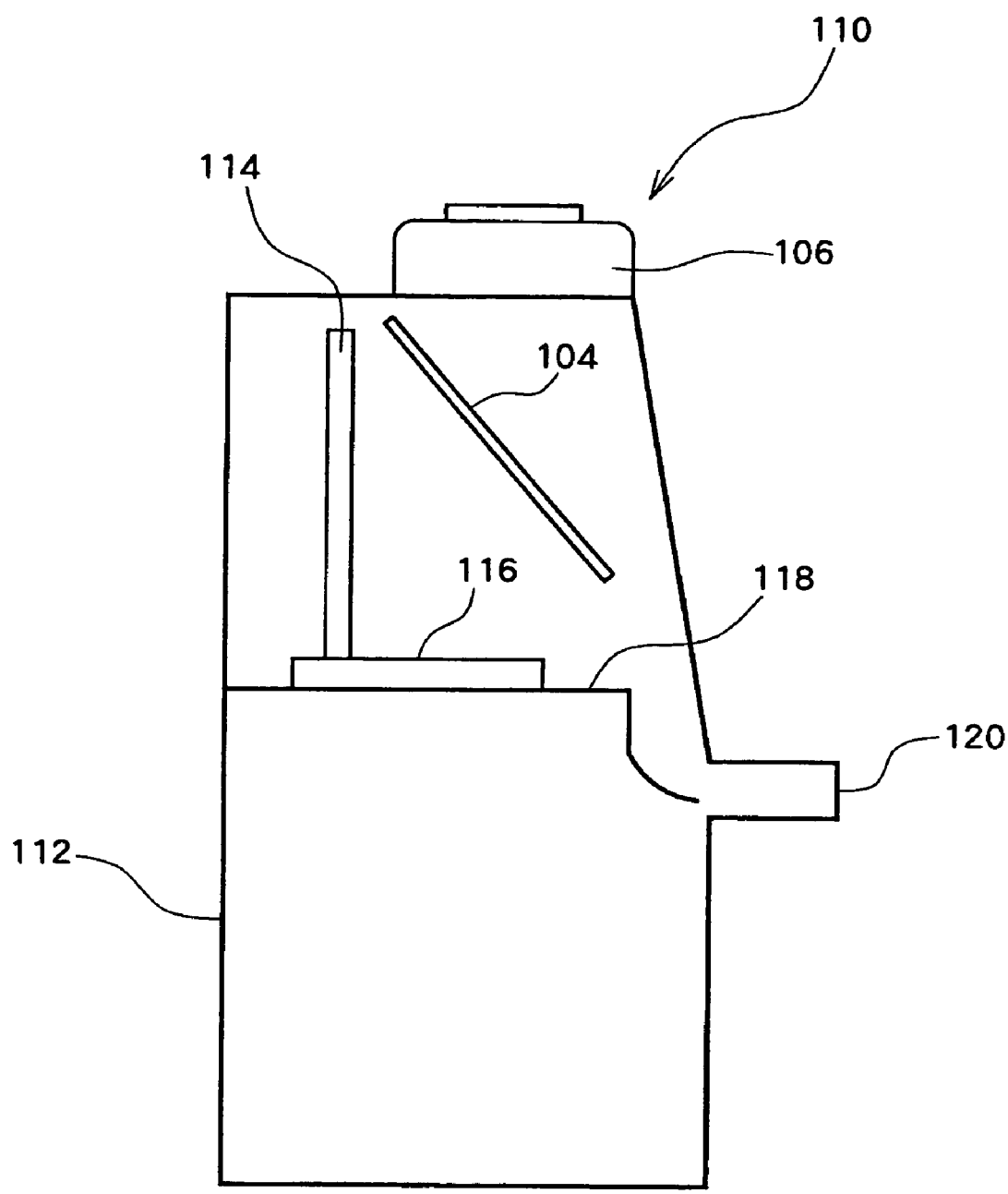
FIG. 5 is a schematic sectional view showing the token game device of FIG. 4.

A token game device 110 utilizes a token 130 as a game medium. As shown in FIGS. 4 and 5, a game board 114 is provided at the upper part inside a housing 112.

A pusher plate 116 which reciprocates back and forth is provided under the game board 114 so that the pusher plate 116 pushes and drops the token on a game field 118.

As shown in FIG. 5, a half mirror 104, which is inclined toward the lower front side at an angle of 45 degrees, for example, is disposed in front of the game board 114. A monitor 106 is disposed above the half mirror 104 so that an image displayed on the monitor 106 is reflected by the half mirror 104.

This allows a game image to be superimposed and displayed on the game board 114 to synthesize the real image of the game board 114 and the virtual image of the monitor 106 (half mirror 104).

An operation section 120 is provided at the front surface of the housing 112. As shown in FIG. 4, a token insertion port 122 is respectively provided on each side of the flat surface of the operation section 120.

A token storage section 125 which stores the token 130 is provided between the token insertion ports 122. A discharge port 124 for discharging a token which has been pushed by the pusher plate 116 and dropped down from the game field 118 is provided in the front surface of the housing 112 at a position near and above the token storage section 125.

Figure 7:
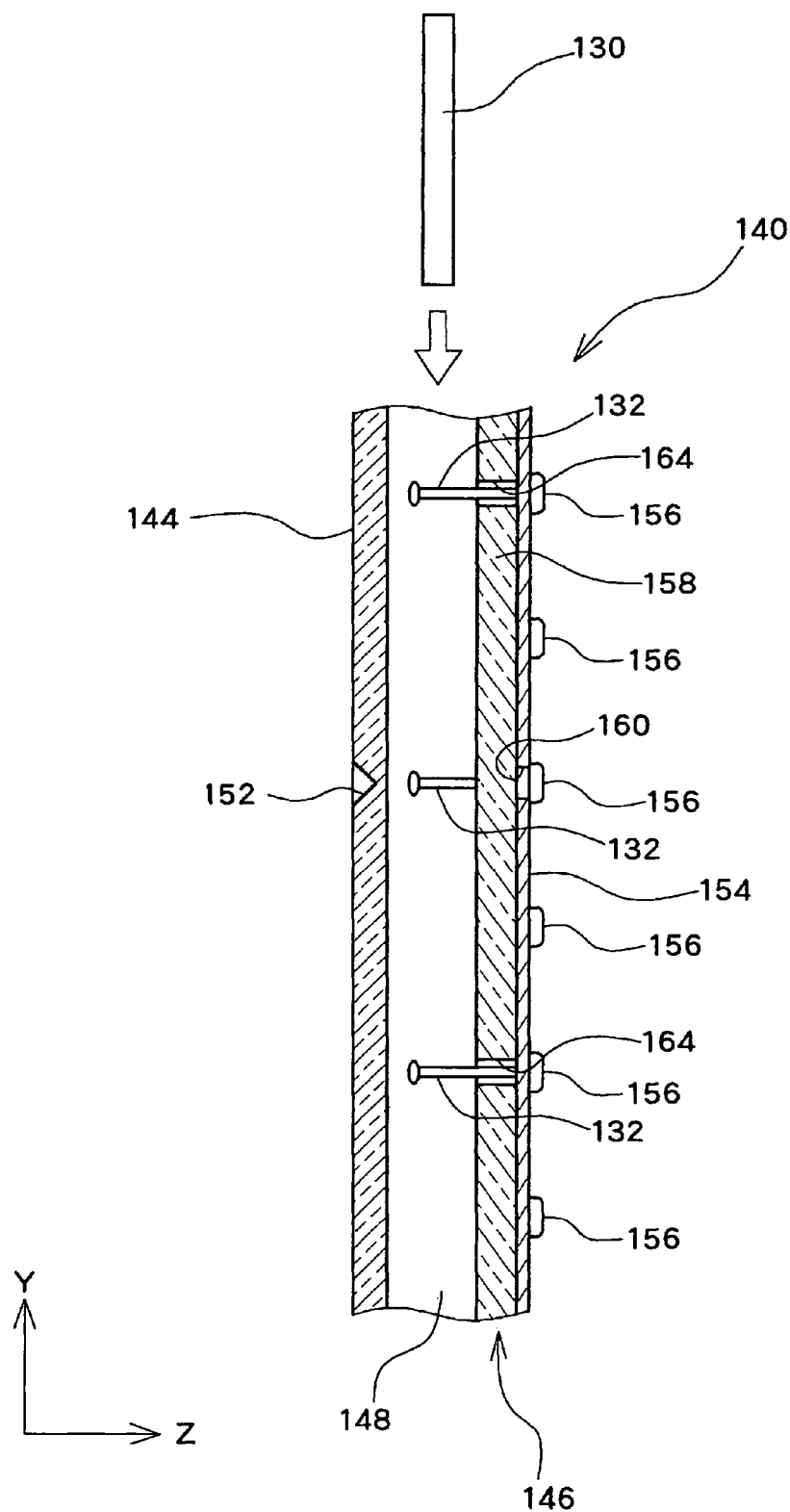
FIG. 7 is a partially enlarged sectional view showing the medium position detection device of FIG. 6.

The game board 114 also serves as a medium position detection device, and includes a token moving space 148 (medium moving space) through which the token 130 passes from above toward the bottom, as shown in FIG. 7. The token moving space 148 is provided with a plurality of nails 132 (pins) which change the falling direction of the token 130, a discharge port 136 for discharging the token 130 provided by a hopper (not shown) into the token moving space 148, as shown in FIG. 1, and a wiper 134 which changes the falling direction of the token 130 discharged from the discharge port 136.

The hopper operates when detecting the token inserted into the token insertion port 122, and discharges the token 130 into the token moving space 148.

As shown in FIG. 7, the game board 114 includes a light-guiding plate 144 which defines the front of the token moving space 148, a detection section 146 which detects light from the light-guiding plate 144, a back plate 154 (base plate) on which the detection section 146 is secured, and a transparent panel 158 provided on the front of the back plate 154.

The light-guiding plate 144 is formed of a transparent flat plate such as an acrylic plate. The inside of the light-guiding plate 144 functions as a light-guiding path.

Figure 6:
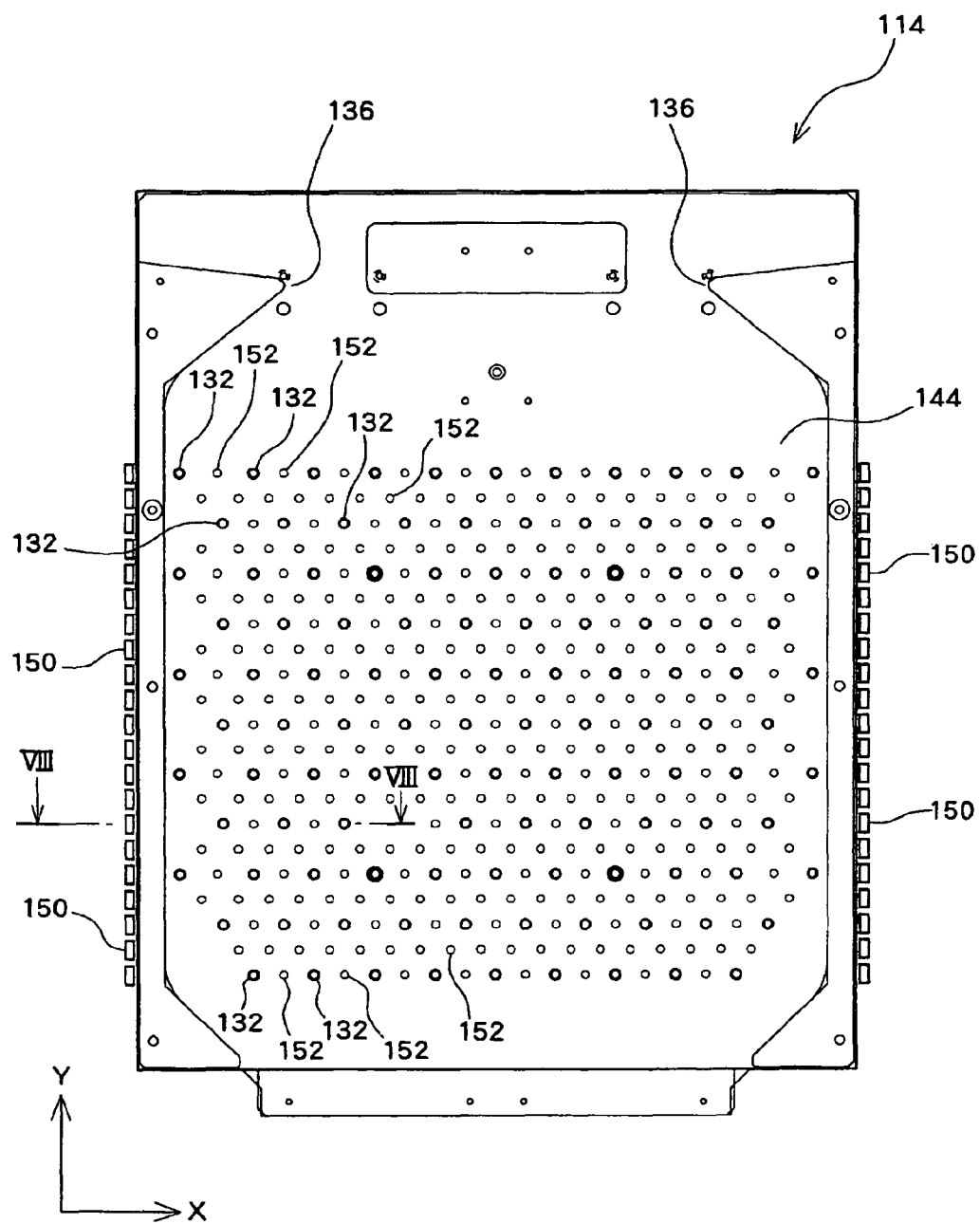
FIG. 6 is an enlarged front view showing the medium position detection device of FIG. 5.

As shown in FIG. 6, a plurality of infrared emitting diodes 150 (light source which supplies light to the light-guiding plate 144) are arranged in the vertical direction on each side of the light-guiding plate 144. The infrared emitting diode 150 emits infrared radiation so that the infrared radiation enters the light-guiding plate 144.

The infrared emitting diode 150 is disposed so that its optical axis passes through the light-guiding plate 144 along the width (X axis) direction of the light-guiding plate 144.

Reflecting sections 152 which correspond to the token detection points and reflect infrared radiation entering the end surface of the light-guiding plate 144 toward a token detection point in the token moving space 148 are provided in the light-guiding plate 144.

Figure 9:
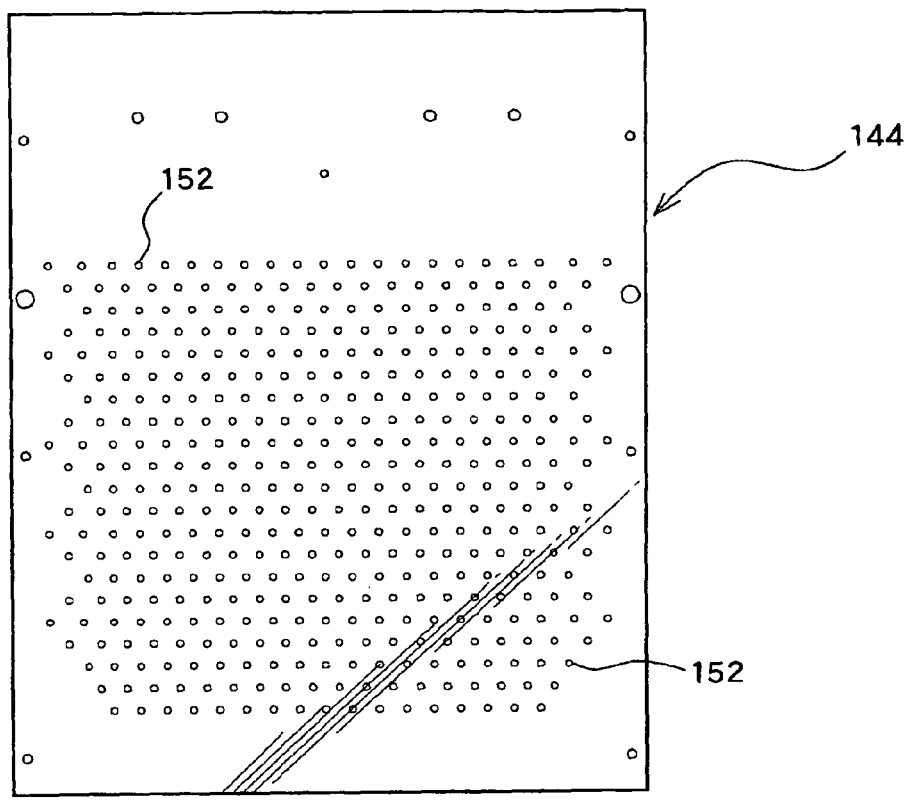
FIG. 9 is a front view showing a light-guiding plate of the medium position detection device.

As shown in FIG. 9, the reflecting sections 152 are provided in a row at specific intervals between the infrared emitting diodes 150 on the right and left at the same vertical position. The rows are arranged in the vertical direction while being displaced by ½ to form a staggered arrangement.

Figure 10:
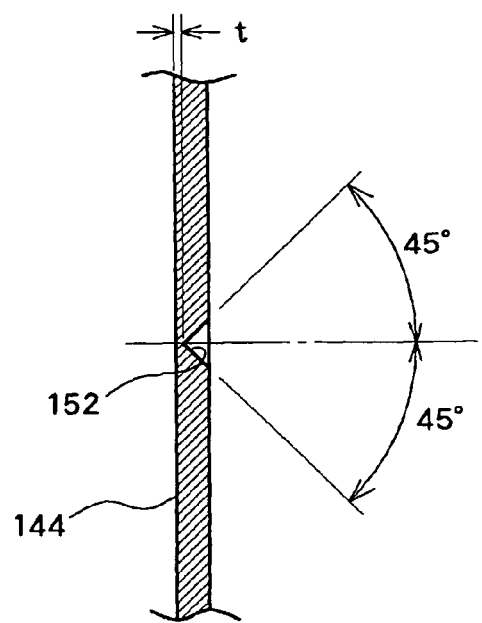
FIG. 10 is an enlarged sectional view showing a reflecting section of FIG. 9.

As shown in FIG. 10, the reflecting section 152 is formed as a conical depression which has an inclined surface at an angle of 45 degrees and is open in the front surface opposite to the detection section 146. The inner surface of the depression is mirror-finished so that infrared radiation supplied from the infrared emitting diode 150 can be squarely reflected toward the detection section 146.

Therefore, infrared radiation supplied from the infrared emitting diode 150 is reflected toward the detection section 146 in a focused state without being diffused.

The light-guiding plate 144 has a thickness t at the bottom of the reflecting section 152 so that infrared radiation is not completely reflected by the reflecting section 152, but passes through the portion with the thickness t and travels toward the adjacent reflecting section 152.

Figure 8:
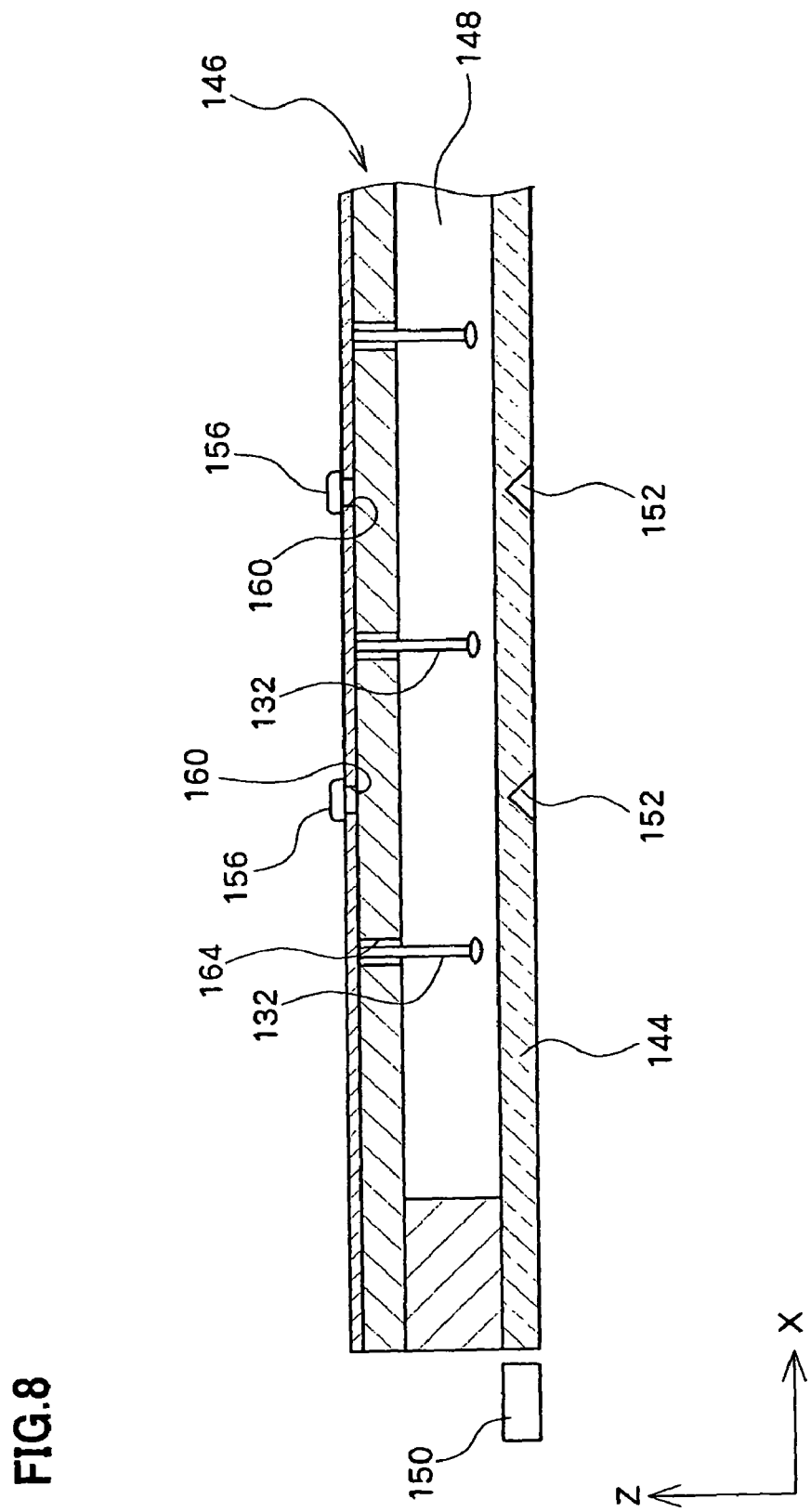
FIG. 8 is a partially enlarged sectional view taken along the VIII-VIII line of FIG. 6.

As shown in FIGS. 7 and 8, the detection section 146 is provided opposite to the light-guiding plate 144 at the bottom of the token moving space 148, and includes a plurality of light-receiving sensors 156 which detect light.

Figure 12B:
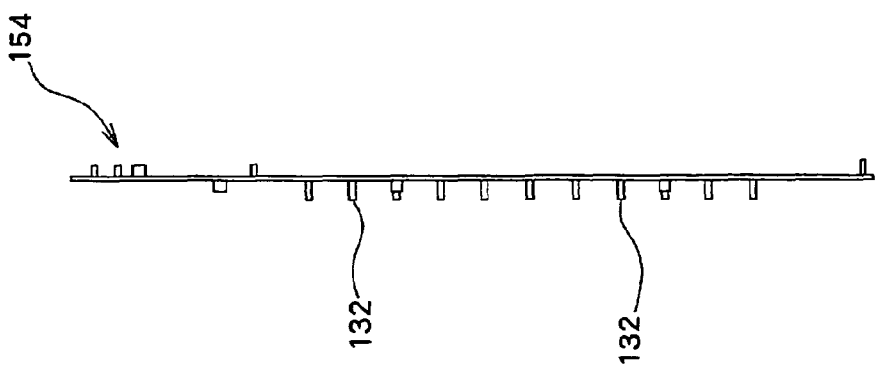
FIG. 12B is a side view showing the back plate of FIG. 12A.
Figure 12A:
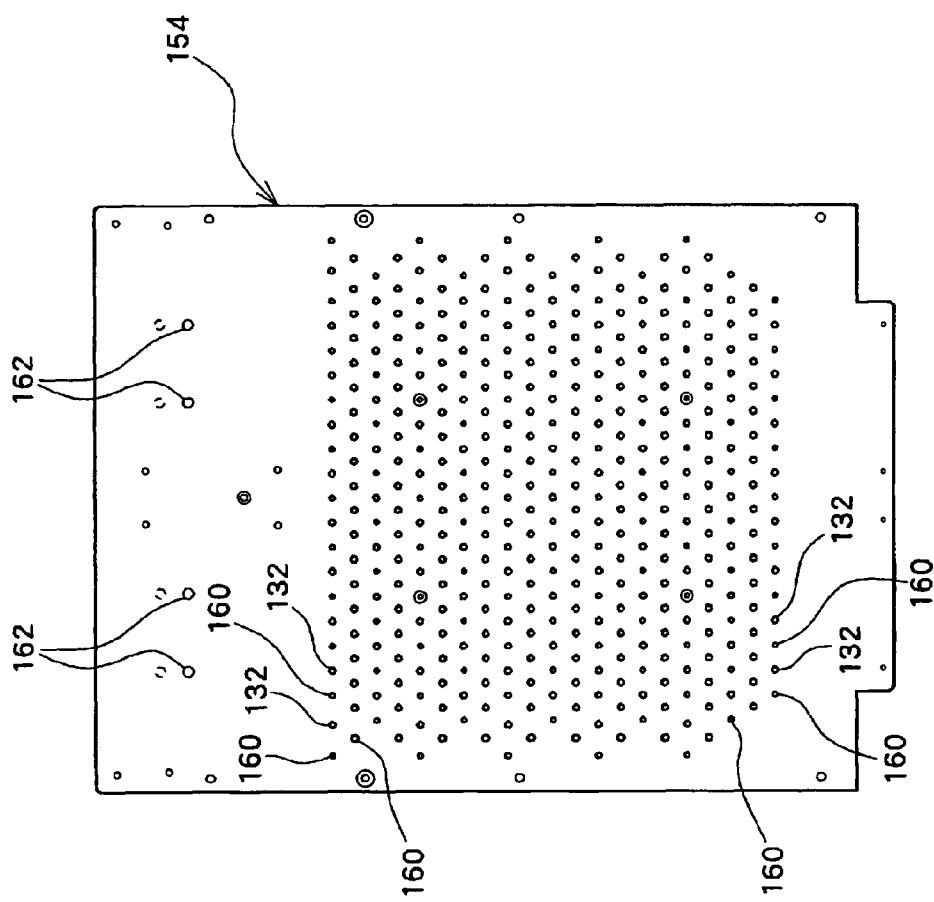
FIG. 12A is a front view showing a back plate of the medium position detection device.

The back plate 154 is provided in front of the light-receiving sensor 156 and prevents external light from entering the light-receiving sensor 156. The back plate 154 is formed of a metal. As shown in FIGS. 12A and 12B, the nails 132 protrude from the back plate 154 into the token moving space 148.

As shown in FIG. 6, the nails 132 are positioned so that the reflecting sections 152 and the nails 132 are alternately disposed in every other row of the reflecting sections 152. Specifically, the reflecting sections 152 and the nails 132 are alternately disposed at equal intervals in the odd-numbered rows of the reflecting sections 152 shown in FIG. 6, and only the reflecting sections 152 are disposed at equal intervals in the even-numbered rows.

As shown in FIG. 12A, light-guiding holes 160 which allow only infrared radiation reflected by the reflecting section 152 to pass therethrough are provided in the back plate 154 in a staggered arrangement at positions in the row of the nails 132 between the nails 132 and opposite to the reflecting sections 152 and positions between the rows of the nails 132 and opposite to the reflecting sections 152.

The light-guiding holes 160 are provided corresponding to the light-receiving sensors 156. The light-receiving sensors 156 are disposed in a staggered arrangement at the bottom of the respective light-guiding holes 160.

The light-guiding hole 160 is formed to have a diameter smaller than that of the reflecting section 152 so that light traveling along the token 130 does not reach the light-receiving sensor 156.

A wiper rotary shaft installation hole 162 is formed in the back plate 154 at the wiper installation position.

The transparent panel 158 has a function of protecting the light-receiving sensor 156 by preventing refuse or the like from entering the light-receiving sensor 156 through the light-guiding hole 160 when the token 130 drops inside the token moving space 148. As shown in FIG. 7, a through-hole 164 from which the nail 132 protrudes is formed in the back plate 154 at a position corresponding to the nail 132 so that the light-guiding hole 160 is covered.

Figure 11:
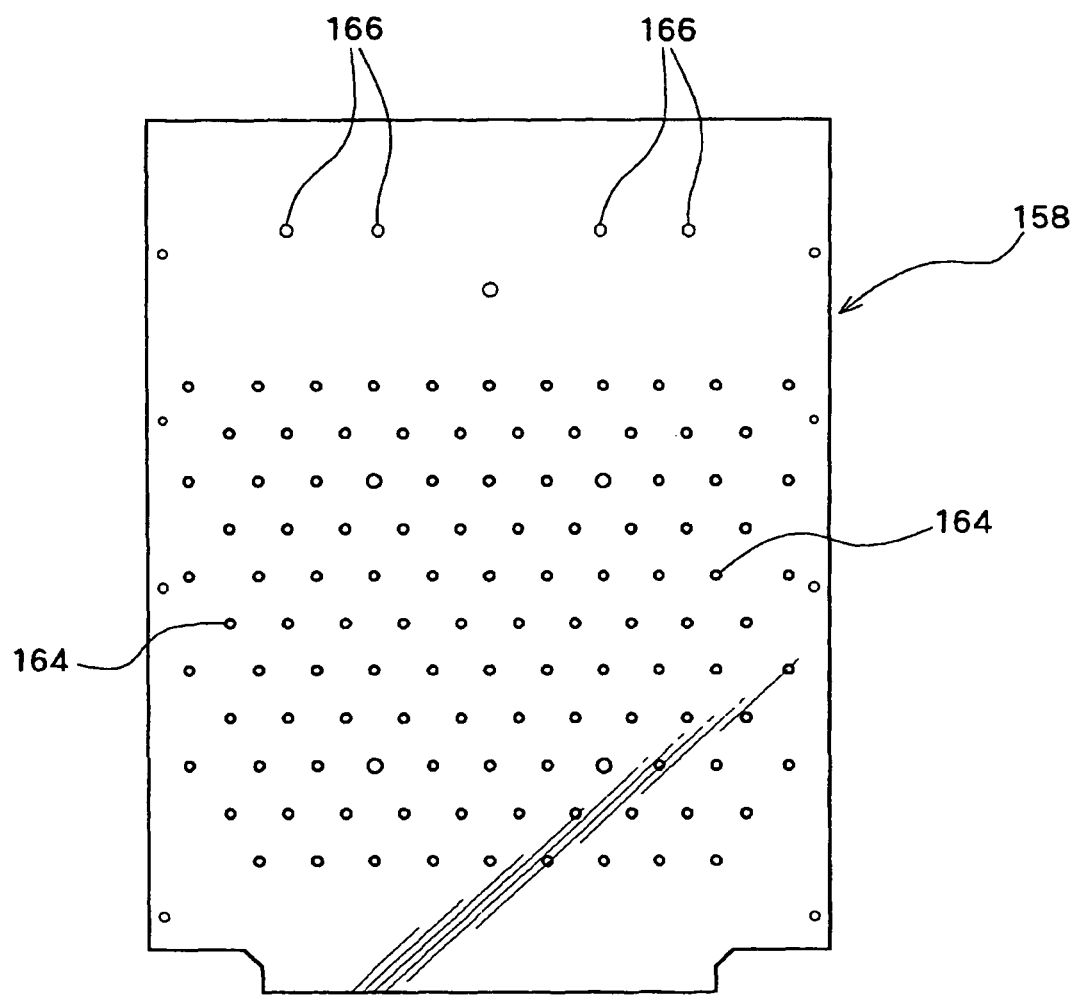
FIG. 11 is a front view showing a transparent panel of the medium position detection device.

As shown in FIG. 11, a wiper rotary shaft through-hole 166 is formed in the transparent panel 158 at the wiper installation position.

The transparent panel 158 is installed in a state in which the nails 132 are provided at the front side of the back plate 154 provided with the light-receiving sensors 156. A rotary shaft is installed in the wiper rotary shaft installation hole 162 and the wiper rotary shaft through-hole 166, and the wiper 134 is provided for the transparent panel 158 on the side of the token moving space 148.

The light-guiding plate 144 is provided in front of the transparent panel 158 at an interval of less than twice the thickness of the token 130, and the infrared emitting diodes 150 are provided on both sides of the light-guiding plate 144 to form the token moving space 148.

The token moving space 148 is formed so that the tokens 130 can simultaneously move inside the token moving space 148 but do not overlap in the depth (Z axis) direction of the token moving space 148.

In this state, the reflecting sections 152, the light-guiding holes 160, and the light-receiving sensors 156 are disposed in a staggered arrangement, and the light-receiving sensors 156 are disposed between the respective nails 132. Therefore, token detection points can be provided between the respective nails 132, whereby the token 130 passing between the nails 132 can be reliably detected.

Since the light-guiding plate 144 is transparent, the token moving space 148 can be observed through the light-guiding plate 144, whereby the moving state of the token 130 passing through the token moving space 148 can be confirmed.

Moreover, even if the light-receiving sensor 156 is protected by covering the light-guiding hole 160 with the transparent panel 158, infrared radiation supplied from the infrared emitting diode 150 and reflected by the reflecting section 152 passes through the transparent panel 158 and is reliably guided toward the light-receiving sensor 156.

Therefore, the light-receiving sensor 156 always receives infrared radiation. A passage of the token 130 can be reliably detected by allowing the token 130 passing through the token moving space 148 to block infrared radiation reflected by the reflecting section 152 at the token detection point.

In particular, even if the player dishonestly applies infrared radiation to the light-receiving sensor 156, since the light-receiving sensor 156 always receives light and enters the detection state only when shaded by the token 130, mischief can be prevented.

As shown in FIGS. 14 to 18, the monitor 106 displays an image showing a chucker 128 and a target 172, an image showing the trace of the token 130, or an image of a roulette or sugoroku (not shown). The image displayed on the monitor 106 and the real image of the game board 114 are synthesized using the half mirror 104.

Figure 13:
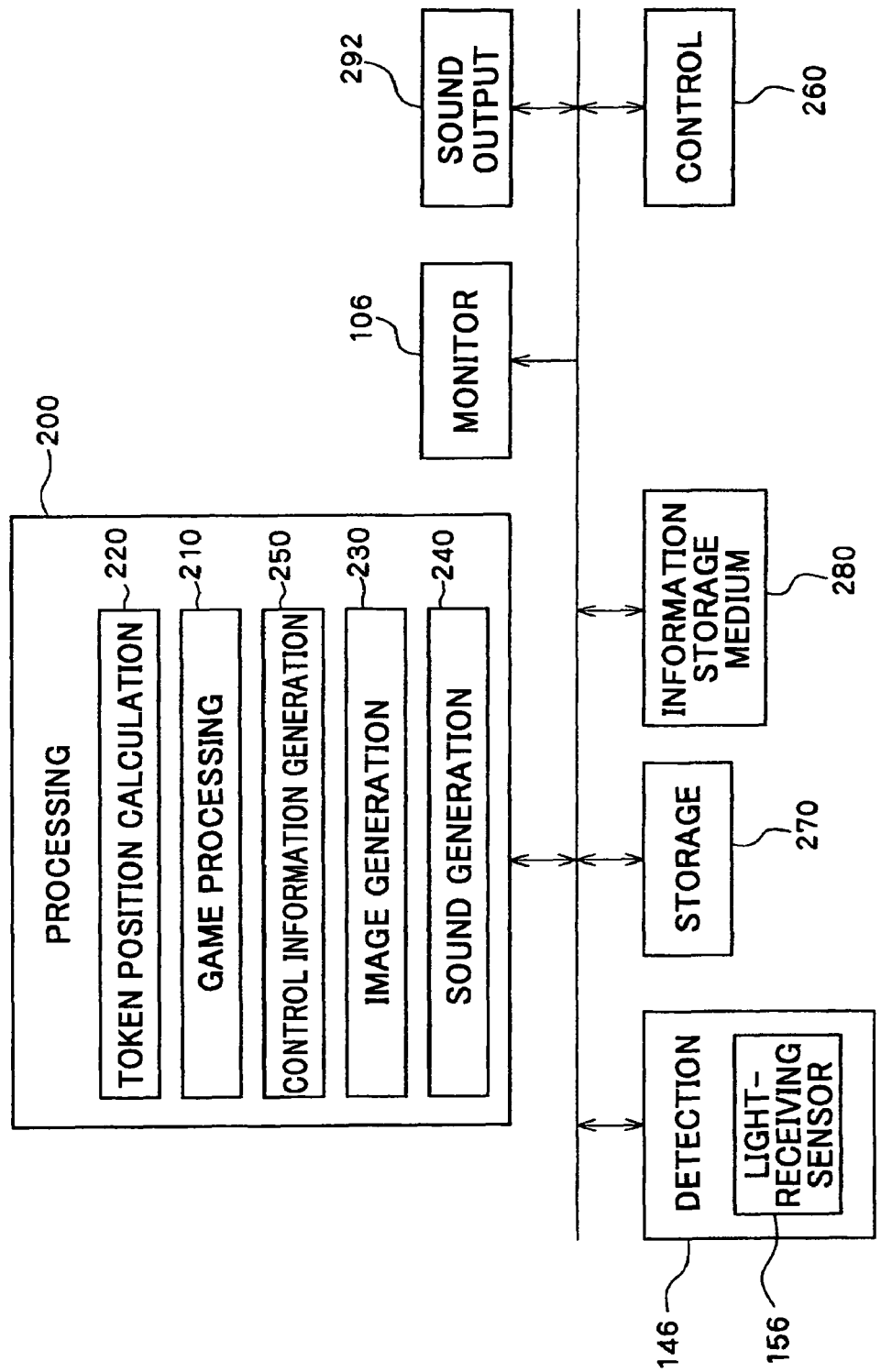
FIG. 13 is a functional block diagram of a token game device according to one embodiment of the invention.

FIG. 13 shows an example of a functional block diagram of the token game device according to this embodiment.

The game device includes a processing section 200, a control section 260, a detection section 146, a storage section 270, an information storage medium 280, a monitor 106, and a sound output section 292.

The processing section 200 controls the entire system, issues instructions to each block in the system, and performs various types of processing such as game processing, image processing, sound processing, or control processing of a token, a pusher, and the like. The function of the processing section 200 may be realized by hardware such as various processors (CPU, DSP, or the like) or an ASIC (gate array or the like) or a given program (game program).

The control section 260 performs various types of control processing of the token game device such as bonus token discharge control.

The detection section 146 is realized by a plurality of light-receiving sensors 156 disposed on the back plate 154, and outputs a detection (light reception) signal of each light-receiving sensor 156 to the processing section 200.

The storage section 270 serves as a work area for the processing section 200 and the like, and may be realized by hardware such as a RAM.

The information storage medium 280 (computer-usable storage medium) stores information such as a program or data. The function of the information storage medium 280 may be realized by hardware such as an optical disk (CD or DVD), magneto-optical disk (MO), magnetic disk, hard disk, magnetic tape, or memory (ROM).

The processing section 200 performs various types of processing based on information stored in the information storage medium 280.

Specifically, information for calculating the position of the token corresponding to the image region displayed on the monitor 106 based on the position of the light-receiving sensor 156 which does not receive light and information (program or data) for preceding with the game are stored in the information storage medium 280.

The information stored in the information storage medium 280 is partially or entirely transferred to the storage section 270 when power is supplied to the system, for example.

The information stored in the information storage medium 280 includes at least one of a program code necessary for preceding with the game, image data, sound data, shape data of a display object, table data, list data, position information of the light-receiving sensor 156, information for calculating the token position, and the like.

The processing section 200 includes a game processing section 210, a token position calculation section 220, an image generation section 230, a sound generation section 240, and a control information generation section 250.

The game processing section 210 performs various types of game processing such as token reception processing, mode setting processing, game progress processing, selection screen setting processing, calculating the position and rotation angle (rotation angle around X, Y, or Z axis) of an object (one or more primitive planes), causing an object to exhibit motion (motion processing), calculating the position of a view point (position of virtual camera) and the angle of the line of sight (rotation angle of virtual camera), disposing an object such as a map object in an object space, hit check processing, calculating the game result (record), or game-over processing based on a detection signal from the token position calculation section 220, a game program, and the like.

The token position calculation section 220 calculates the position of the token based on the light reception signal from the detection section 146 so that the token detection region in the detection section 146 is associated with the game image region displayed on the monitor 106.

The image generation section 230 performs various types of image processing according to instructions from the game processing section 210 or the like. For example, the image generation section 230 outputs an image as the target of the token 130 or the like to the monitor 106.

The sound generation section 240 performs various types of sound processing based on instructions from the game processing section 210 or the like to generate sound such as BGM, effect sound, or voice, and outputs the generated sound to the sound output section 292.

The control information generation section 250 generates a signal for controlling various types of hardware of the token game device, such as discharging a token, according to instructions from the game processing section 210 or the like.

The functions of the game processing section 210, the token position calculation section 220, the image generation section 230, the sound generation section 240, and the control information generation section 250 may be entirely realized by either hardware or a program.

The functions of the game processing section 210, the token position calculation section 220, the image generation section 230, the sound generation section 240, and the control information generation section 250 may be realized by hardware and a program.

The game progress processing is described below with reference to FIGS. 14 to 18.

Figure 14:
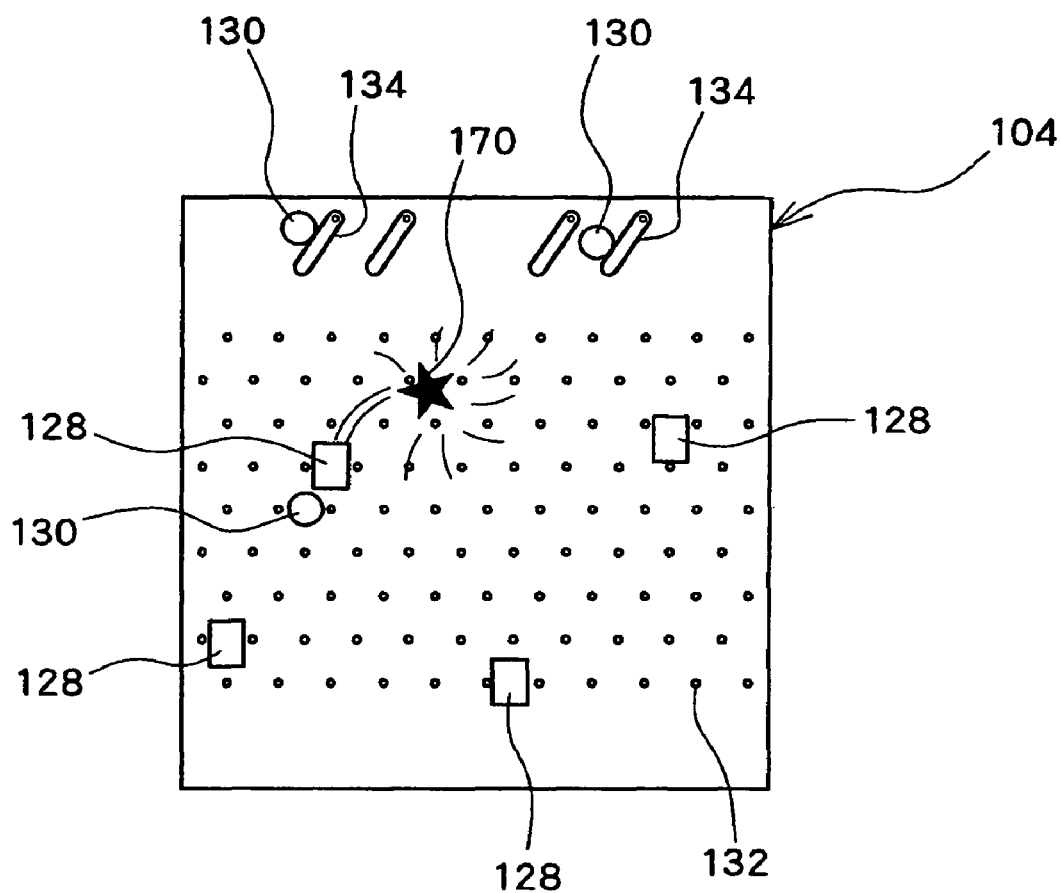
FIG. 14 is a front view showing an image display state of a half mirror.

As shown in FIG. 14, the chucker 128 is displayed on the half mirror 104. The display position of the chucker 128 is compared with the position of the token 130 moving inside the token moving space 148 calculated by the token position calculation section 220 based on the signal from the detection section 146. When it is confirmed that the display position of the chucker 128 coincides with the position of the token 130, it is determined that the token has passed through the chucker 128, and a calculation image 170 showing the passage through the chucker 128 is displayed.

A slot game or a bingo game may be performed utilizing the chucker passage information in the same manner as in a known token game device.

FIGS. 15 to 18 show other examples of the game image displayed on the monitor 106 (half mirror 104).

Figure 15A:
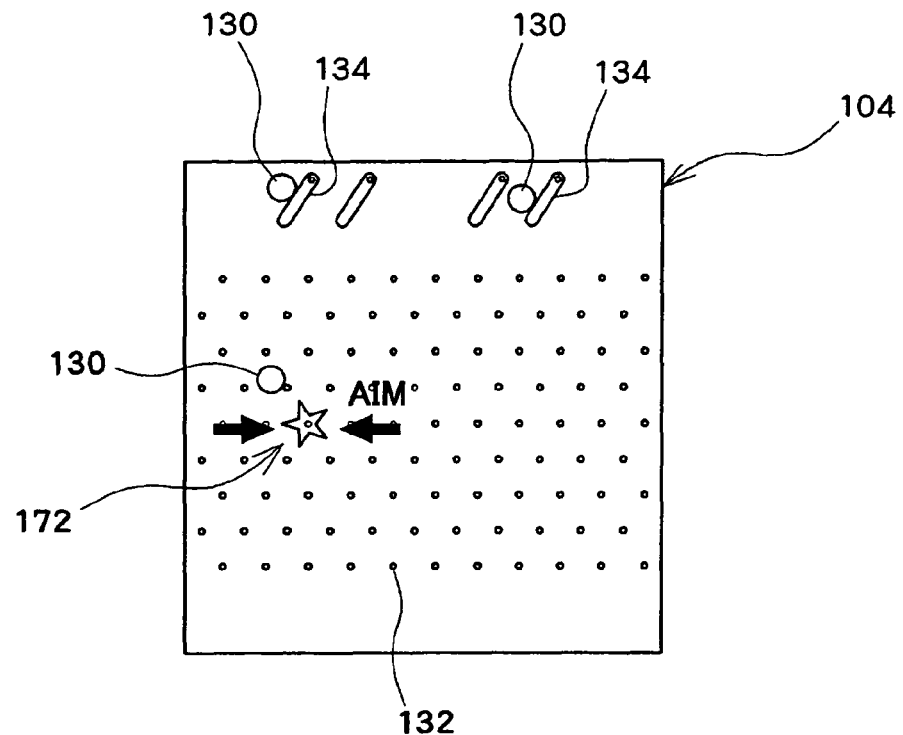
FIG. 15A is a front view showing a target in another game image of the half mirror.
Figure 15B:
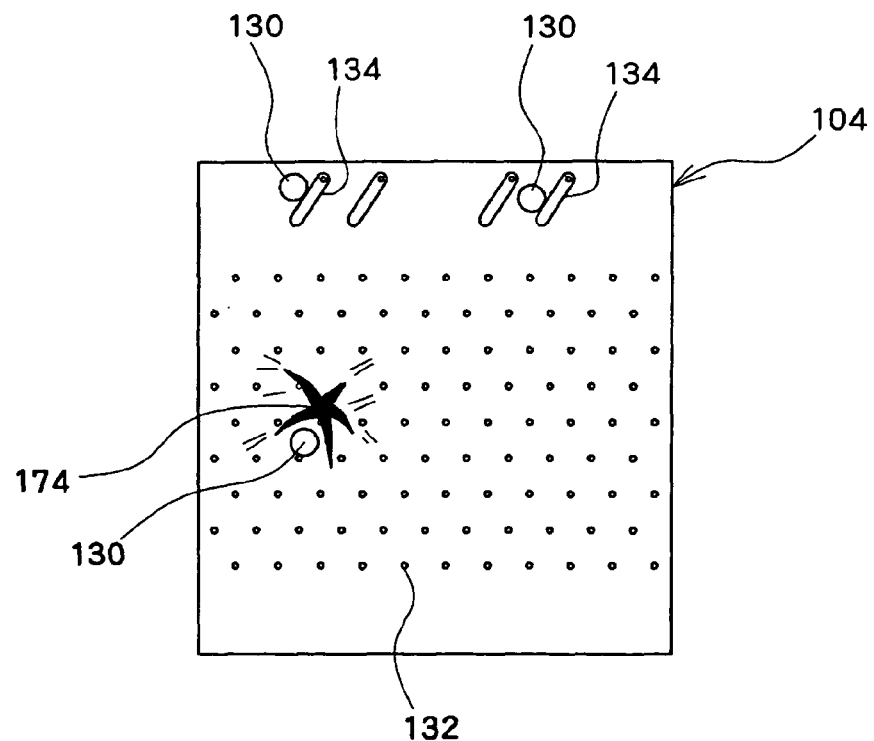
FIG. 15B is a front view showing a reaction image after the state of FIG. 15A.

In FIG. 15, the target 172 in a state in which a star is positioned between arrows together with characters "Aim" is displayed on the monitor 106 (half mirror 104), as shown in 15A. The player drops the token 130 aiming at the target 172. When the token 130 has hit the target 172, a loud effect image 174 is displayed, as shown in 15B. The position of the target 172 is changed each time, thereby increasing interest in the game.

Figure 16:
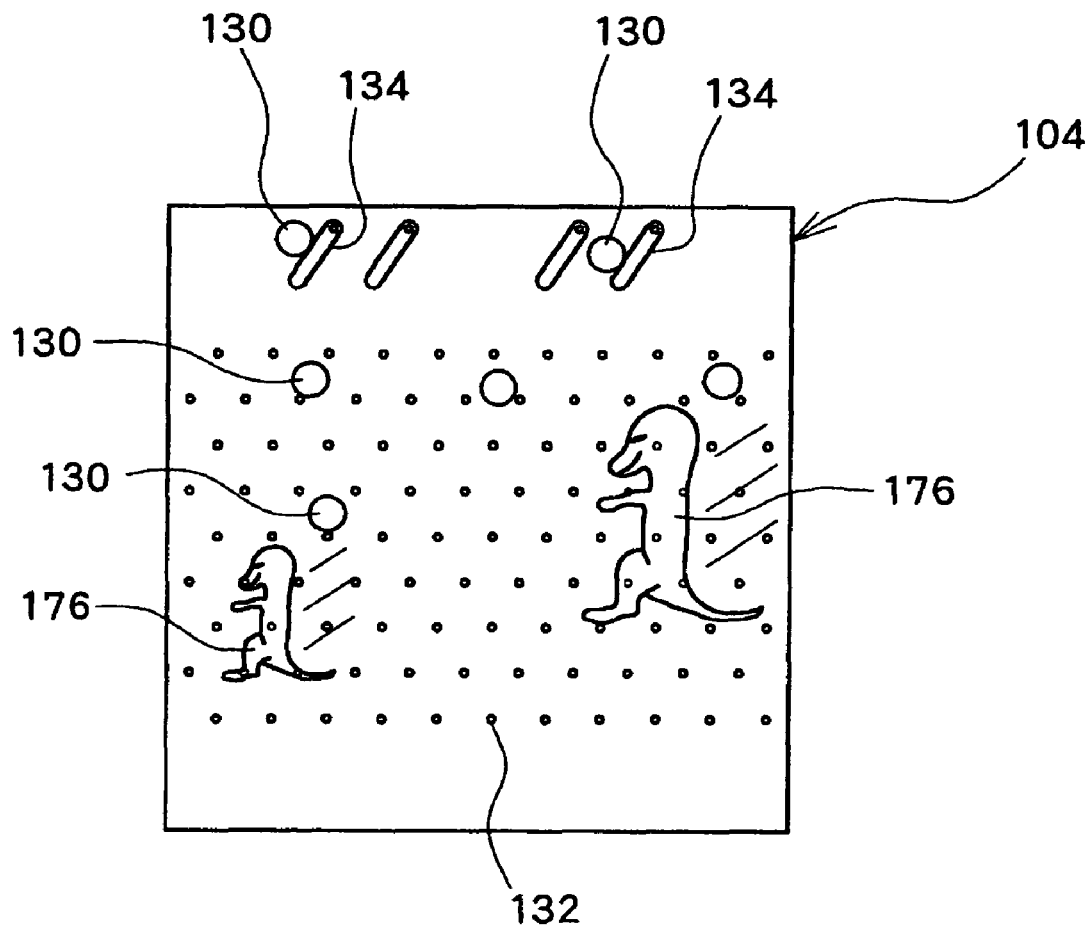
FIG. 16 is a front view showing another game image of the half mirror.

In FIG. 16, a game is provided in which a moving monster 176 is displayed on the monitor 106 (half mirror 104), and the player hits the token 130 against the moving monster 176, thereby increasing interest in the game.

Figure 17:
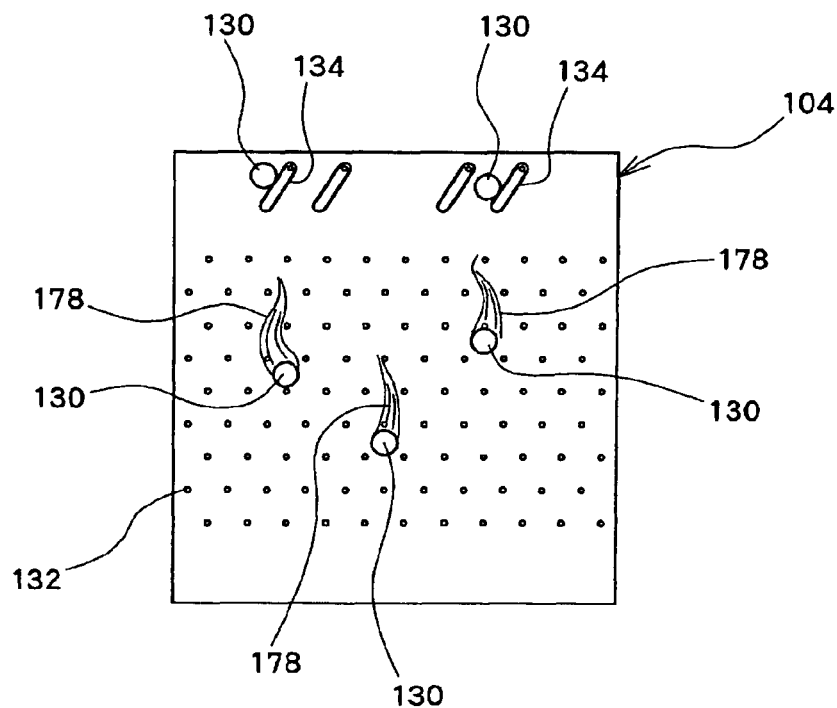
FIG. 17 is a front view showing another game image of the half mirror.

In FIG. 17, interest in the game is increased by displaying the path of the token 130 which falls inside the token moving space 148 on the monitor 106 (half mirror 104) as an image 178 in which the token 130 leave its traces. In this case, the image 178 showing the trace of the token 130 is displayed over the token 130 which moves inside the token moving space 148 based on the token position calculated by the token position calculation section 220 based on the signal from the detection section 146.

Figure 18:
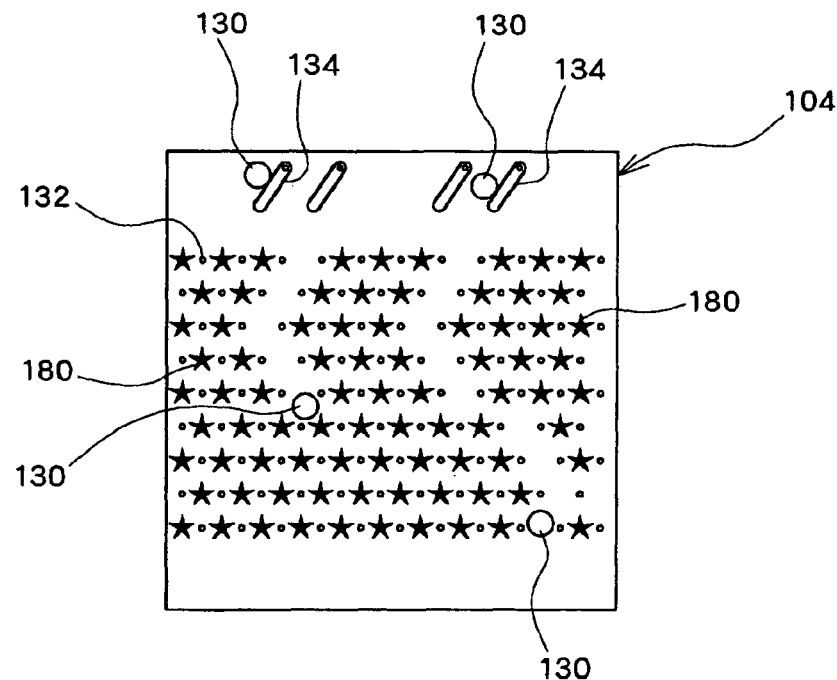
FIG. 18 is a front view showing another game image of the half mirror.

In FIG. 18, targets 180 are displayed on the monitor 106 (half mirror 104) at positions corresponding to all the light-receiving sensors 156, and the player breaks the target 180 using the falling token 130, whereby interest in the game is increased.

Although not shown, a breeding game or a story-driven game may be provided by adding a breeding element or story to the image displayed on the monitor.

An embodiment of a display device including the medium position detection device according to the invention is described below with reference to FIG. 19.

Figure 19:
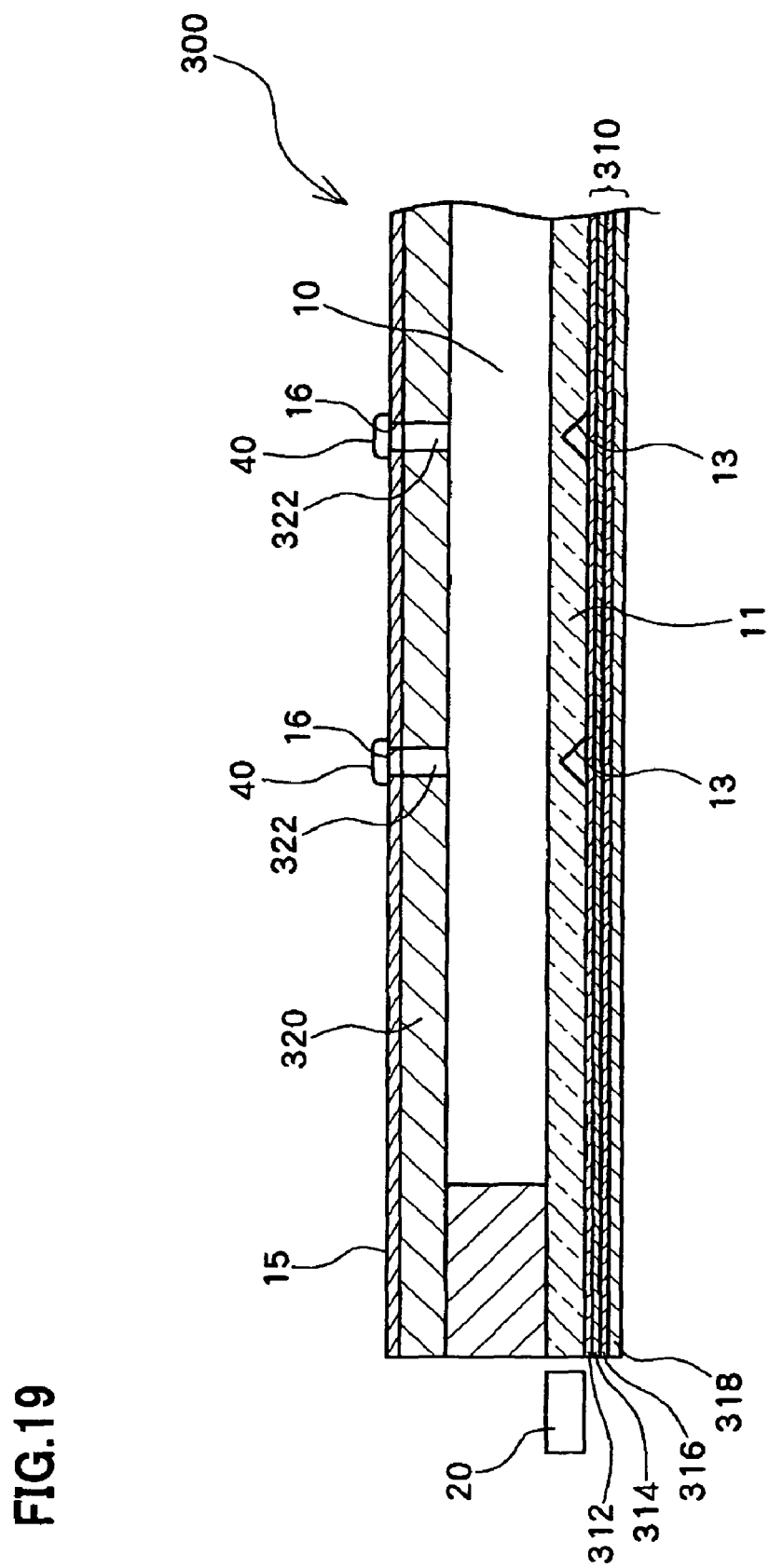
FIG. 19 is a schematic sectional view showing a display device having a medium position detection device according to one embodiment of the invention.

A display device 300 shown in FIG. 19 includes the above medium position detection device, liquid crystal display means 310 provided on the front of the light-guiding plate 11, and a reflecting plate 320 provided on the front of the back plate 15 (surface on the side of the medium moving space 10).

The liquid crystal display means 310 includes a light diffusion sheet 312 disposed on the front of the light-guiding plate 11, a light collecting sheet 314 disposed on the front of the light diffusion sheet 312, a light collecting sheet 316 disposed on the front of the light collecting sheet 314, and a liquid crystal panel 318 disposed on the front of the light collecting sheet 316.

The light diffusion sheet 312 diffuses light from the light-guiding plate 11 to achieve a uniform luminance, and the light collecting sheets 314 and 316 collect light which spreads in the width direction (lateral direction in FIG. 19) and the height direction (longitudinal direction in FIG. 19), respectively, to increase the utilization efficiency of light from the front side of the light-guiding plate 11.

The reflecting plate 320 reflects light from the back surface of the light-guiding plate 11 toward the medium moving space 10, toward the light-guiding plate 11 to increase the light utilization efficiency.

Since the display device 300 utilizes a white light-emitting diode as the light source 20, a sensor which detects white light is used as the light-receiving sensor 40.

As the light-guiding plate 11, a light-guiding plate with a higher luminance on a front surface is preferably used.

Another embodiment of a display device including the medium position detection device according to the invention is described below with reference to FIG. 20.

In a display device 400, a light-guiding plate 410 having a reflecting section 412 in the same manner as the above light-guiding plate and a light source (not shown) such as an infrared emitting diode are disposed for medium position detection. A light-guiding plate 420 and a fluorescent tube (cold-cathode tube) for a backlight of a liquid crystal panel 430 and a light source (not shown) such as a white light-emitting diode are further disposed.

In order to improve the utilization efficiency of light entering the light-guiding plate 420, a reflecting sheet 447 is disposed on the front (left in FIG. 20) of a back plate 454, the light-guiding plate 420 is disposed on the front of the reflecting sheet 447, and a light diffusion sheet 449 is disposed on the front of the light-guiding plate 420.

Note that a light collecting sheet may be arbitrarily disposed between the light-guiding plate 420 and the light diffusion sheet 447.

Communication holes 460 for guiding light from the back surface of the light-guiding plate 410 to the light-receiving sensors 456 secured to the back plate 454 are provided in the light-guiding plate 420, the reflecting sheet 447, and the light diffusion sheet 449 at positions opposite to the reflecting sections 412 of the light-guiding plate 410. Each communication hole 460 is provided with a shading cylindrical member 453 so that the light-receiving sensor 456 does not detect light from the light-guiding plate 420.

A shading material may be applied to the inner surface of the communication hole 460 in order to prevent light from exitting from the communication hole 460 in the light-guiding plate 420.

Figure 20:
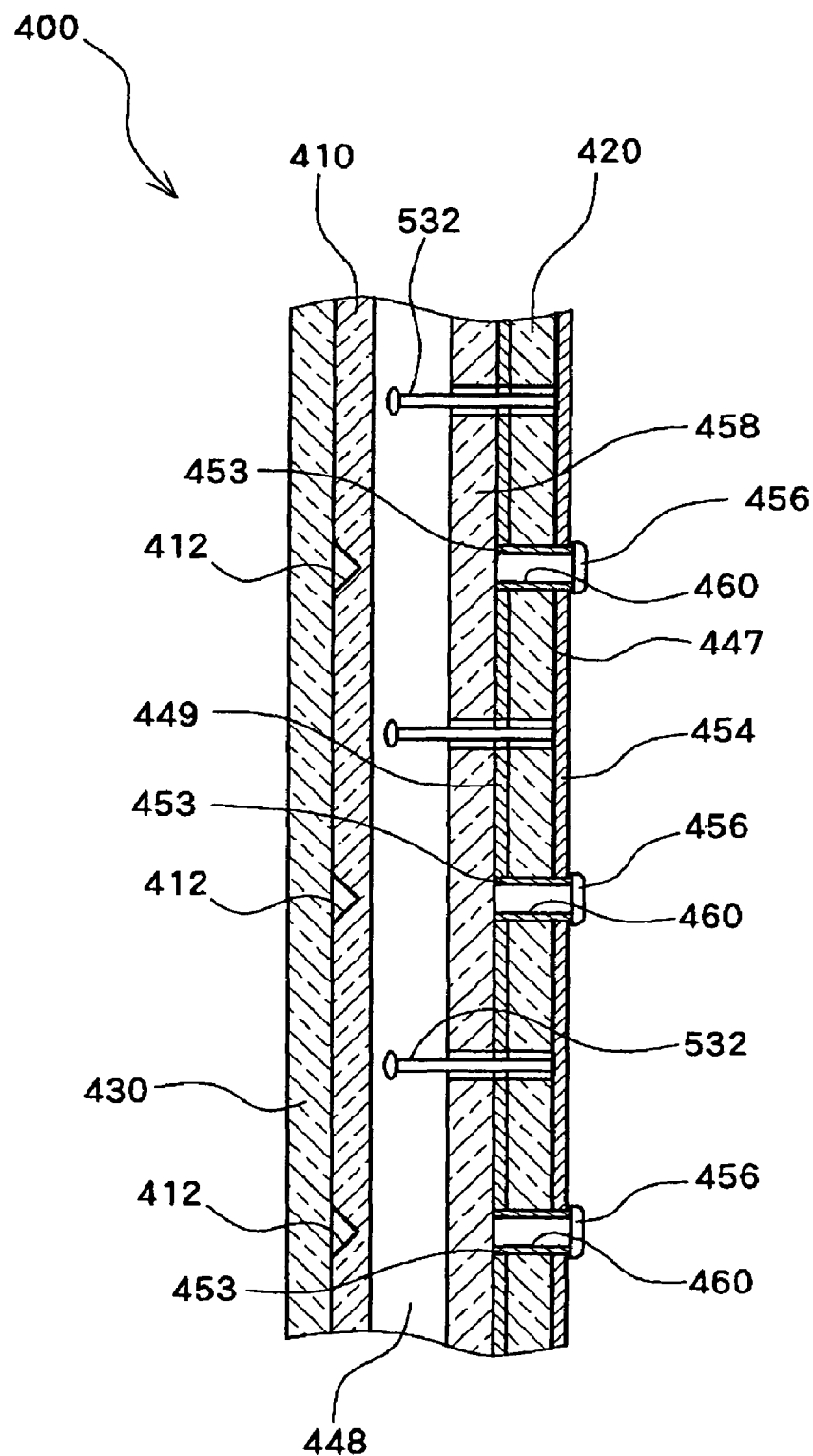
FIG. 20 is a schematic sectional view showing a display device having a medium position detection device according to another embodiment of the invention.

FIG. 20 is a view showing an example using the display device 400 for a token game device. Nails 532 protrude from the back plate 454, and a transparent panel 458 which prevents refuse or the like from entering the cylindrical member 453 is provided on the front of the light diffusion sheet 449.

Holes for allowing the nails 532 to protrude into the medium moving space 448 are formed in the reflecting sheet 449, the light-guiding plate 420, the light diffusion sheet 449, and the transparent panel 458.

This provides a game device similar to that of the above embodiment.

The remaining configurations and effects are the same as in the above embodiment. Therefore, further description is omitted.

The invention is not limited to the above-described embodiments. Various modifications and variations may be made within the spirit and scope of the invention.

For example, the reflecting section in the light-guiding plate of the medium position detection device is not limited to a conical depression, but may have various shapes such as a V-shaped depression, a triangular pyramid, or quadrangular pyramid insofar as the reflecting section squarely reflects light. The reflecting section is not limited to a depression, but may be a through-hole.

The transparent panel of the medium position detection device may be omitted when refuse or the like is not formed.

In the embodiments shown in FIGS. 1 to 8 and 20, the infrared emitting diode which emits invisible light is used as the light source of the medium position detection device in order to allow the medium to be easily observed. Note that the light source is not limited thereto. A light source which emits visible light may be used depending on the conditions.

In the embodiments shown in FIGS. 1 to 19, the medium position detection device has a configuration in which the light-guiding hole is formed in the base plate. A cylindrical member for preventing external light from leaking toward the detection sensor may be provided corresponding to each detection sensor depending on the use conditions.

It is also possible to directly apply light from the light source to the detection sensor without using the light-guiding hole.

The embodiments shown in FIGS. 4 to 18 illustrate the token game device. Note that the embodiments may also be used for various game devices in which a game is performed by moving a medium in a given space, such as a pinball machine or a pinball game device. The medium is not limited to the token. A coin, a token, a coin used as currency, a game ball, various gifts, and the like may also be used.

When using a light source which emits visible light, light emitted toward the light-guiding plate may be used as a backlight for a liquid crystal panel.

The invention claimed is:

1. A display device comprising:
   a light-guiding plate and a base plate defining a medium moving space therebetween, the light-guiding plate being deposed in front of the base plate in a depth direction, a dimension of the medium moving space between the light-guiding plate and the base plate being less than twice thickness of a medium that moves in the medium moving space;
   a light source that is disposed on a side of the light-guiding plate so that light emitted from the light source enters the side of the light-guiding plate;
   a reflecting section that is formed in the light-guiding plate, and that reflects the light from the light source toward the medium moving space;
   a plurality of light-guiding holes that are formed in the base plate, and through which light from the light-guiding plate passes;
   a detection device that is disposed behind the base plate in the depth direction, and that detects light though the plurality of light-guiding holes;
   a liquid crystal display that is disposed in front of the light-guiding plate in the depth direction;

a reflecting material that is disposed on a front surface of the base plate in the depth direction, and that reflects the light from the light-guiding plate; and a plurality of communication holes that are provided in the reflecting material, and that each communicates with the light-guiding holes in the base plate.

2. The display device as defined in claim 1, wherein the reflecting section is formed in the light-guiding plate as a conical depression which is open on the side opposite to the detection device.

3. The display device as defined in claim 1, wherein the detection device includes a plurality of light-receiving sensors, and the light-receiving sensors are disposed in a staggered arrangement or a matrix.

4. The display device as defined in claim 3, wherein the reflecting section is disposed at a position opposite to the light-receiving sensor.

5. The display device as defined in claim 1, wherein at least one of a light collecting sheet and a light diffusion sheet is provided between the light-guiding plate and the liquid crystal display.

6. A game device comprising the display device as defined in claim 1.

7. A display device comprising:

a light-guiding plate and a base plate defining a medium moving space therebetween, the light-guiding plate being disposed in front of the base plate in a depth direction, a dimension of the medium moving space between the light-guiding plate and the base plate being less than twice thickness of a medium that moves in the medium moving space;

a light source that is disposed on a side of the light-guiding plate so that light emitted from the light source enters the side of the light-guiding plate;

a reflecting section that is formed in the light-guiding plate, and that reflects the light from the light source toward the medium moving space;

a plurality of light-guiding holes that are formed in the base plate, and through which light from the light-guiding plate passes;

a detection device that is disposed behind the base plate in the depth direction, and that detects light though the plurality of light-guiding holes;

a liquid crystal display that is disposed in front of the light-guiding plate in the depth direction;

a backlight for the liquid crystal display that is disposed between the base plate and the medium moving space, the backlight including:

an other light-guiding plate for liquid crystal display; and an other light source that is disposed so that light emitted from the other light source enters the side of the other light-guiding plate; and a plurality of first communication holes that are provided in the other light-guiding plate, and that each communicate with the plurality of light-guiding hole in the base plate, each of the plurality of first communication holes having a cylindrical member that blocks light.

8. The display device as defined in claim 7, further comprising:

a reflecting material that reflects light from the light-guiding plate for the liquid crystal display is provided between the base plate and the light-guiding plate for the liquid crystal display; and a plurality of second communication holes that are provided in the reflecting material, the plurality of second communication holes each communicating with the plurality of first communication holes in the base plate.

9. The display device as defined in claim 7, further comprising:

at least one of a light collecting sheet and a light diffusion sheet is provided on the front surface of the other light-guiding plate in the depth direction; and a plurality of second communication holes that are provided in the light collecting sheet and/or the light diffusion sheet, each of the plurality of second communication holes communicating with the light-guiding hole in the base plate.

10. The display device as defined in claim 7, wherein the reflecting section is formed in the light-guiding plate as a conical depression which is open on the side opposite to the detection device.

11. The display device as defined in claim 7, wherein the detection device includes a plurality of light-receiving sensors, and wherein the light-receiving sensors are disposed in a staggered arrangement or a matrix.

12. The display device as defined in claim 11, wherein the reflecting section is disposed at a position opposite to the light-receiving sensor.

13. A game device comprising the display device as defined in claim 7.

* * * * *